United States Patent
Ludwig et al.

(10) Patent No.: US 6,240,696 B1
(45) Date of Patent: Jun. 5, 2001

(54) ANCHOR ROD FOR A CONNECTION ANCHORING SYSTEM

(75) Inventors: Wolfgang Ludwig, Schwabmünchen; Erich Leibhard, Munich, both of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/338,714

(22) Filed: Jun. 23, 1999

(30) Foreign Application Priority Data

Jun. 23, 1998 (DE) .............................................. 198 27 829

(51) Int. Cl.[7] ...................................................... F16B 39/00
(52) U.S. Cl. .............................. 52/698; 405/259.5; 411/82
(58) Field of Search ................................. 52/698; 411/82, 411/82.3, 930, 386; 405/259.5, 259.1

(56) References Cited

U.S. PATENT DOCUMENTS

| Re. 35,659 | * | 11/1997 | Ernst et al. .............................. 411/82 |
| 2,782,883 | * | 2/1957 | Rosan . |
| 4,193,246 | * | 3/1980 | Schiefer et al. ........................ 52/698 |
| 4,195,709 | * | 4/1980 | Gianotti et al. ..................... 52/698 X |
| 4,305,687 | * | 12/1981 | Parker .................................. 405/260 |
| 5,060,447 | * | 10/1991 | Rinklake et al. ...................... 52/698 |
| 5,483,781 | * | 1/1996 | Ernst et al. ............................ 52/698 |
| 5,653,563 | * | 8/1997 | Ernst et al. ............................ 411/82 |
| 5,735,653 | * | 4/1998 | Schiefer et al. ....................... 411/82 |
| 5,740,651 | * | 4/1998 | Vanotti .................................. 52/698 |
| 6,029,417 | * | 2/2000 | Leibhard et al. .................. 52/698 X |

* cited by examiner

Primary Examiner—Robert W. Gibson, Jr.
(74) Attorney, Agent, or Firm—Brown & wood, LLP

(57) ABSTRACT

An anchor rod to be received in a bore filled with mortar mass including a connection region (2, 22, 32) having a plurality of axially arranged one after another, conical enlargements (4, 24, 34) a diameter of which increases in a setting direction and which are provided with circumferential sections (5, 25, 35) radially spaced from a longitudinal axis of the anchor rod (1, 21, 31) by a greatest distance, having a radius (r) smaller by from about 0.1 mm to about 1.5 mm then a half of a nominal diameter of the anchoring region receiving bore, and extending, respectively, in a circumferential direction over an angle of up to 300°.

4 Claims, 1 Drawing Sheet

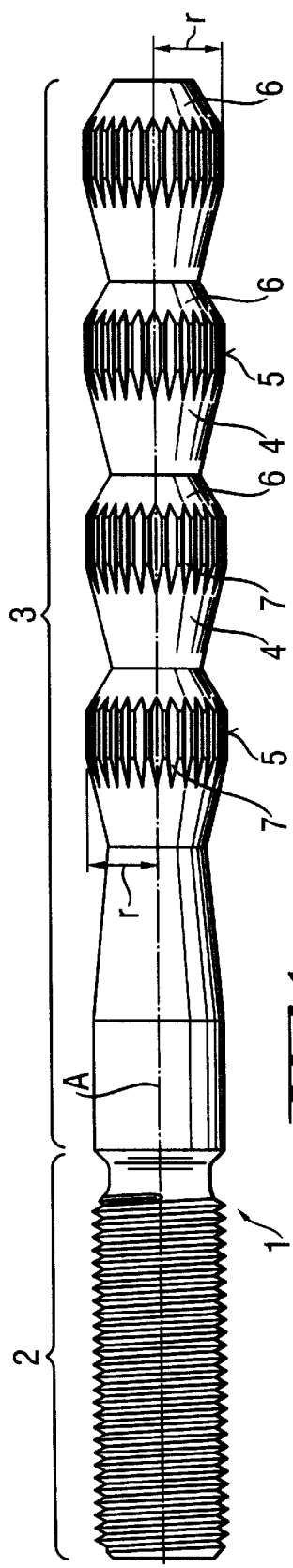
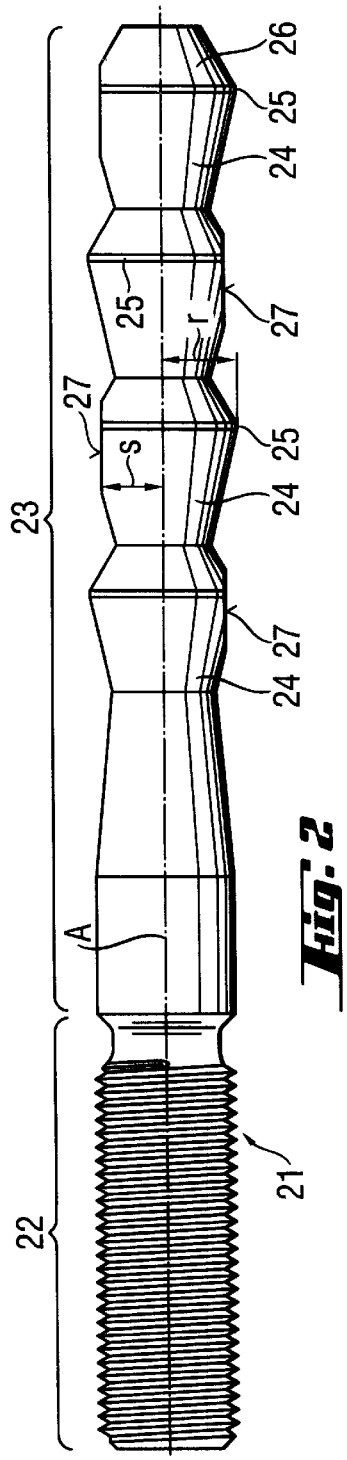
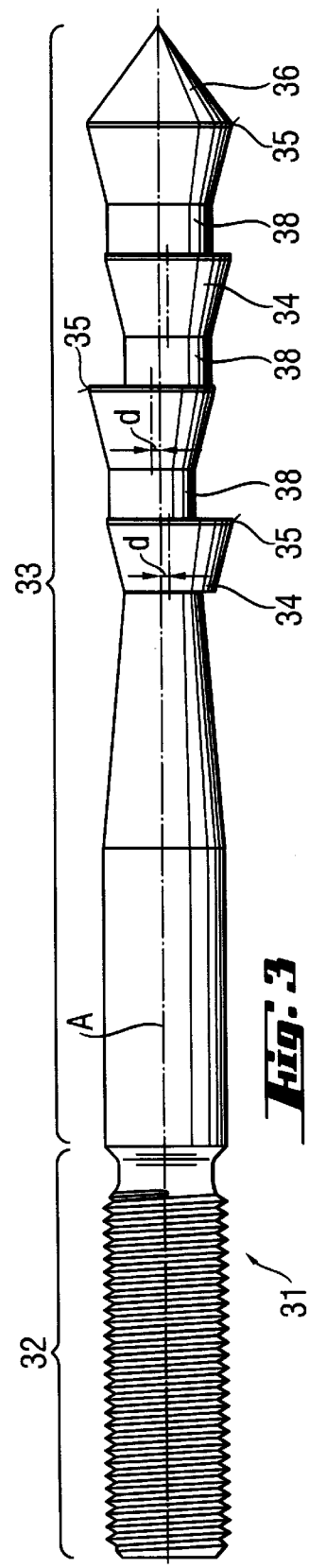

ANCHOR ROD FOR A CONNECTION ANCHORING SYSTEM

BACKGROUND OF THE INVENTION

1. Field of the Invention

The present invention relates to an anchor rod to be received in a bore filled with a mortar mass and having a connection region and an anchoring region provided with a plurality of axially arranged one after another, conical enlargements the diameter of which increases in a setting direction.

2. Description of the Prior Art

In addition to classical connection systems with which attachment points are formed by an expansion dowel which is form-and/or force-lockingly anchored in a bore, prior art discloses a chemical connection technology according to which an anchor rod is inserted in a receiving bore filled with a mortar mass and becomes secured there after hardening of the mortar mass. The advantage of the later connection systems consists in that they are free of expansion pressure to a greatest possible degree and, therefore, allow for small spacings between the axes and edges. For heavy duty attachments, connection anchor systems are used with which a multi-component organic and/or inorganic mortar mass fills a preliminary formed bore, with the components of the mortar mass being separated, before anchoring, by their glass or plastic packing. An anchor rod for use with such a system is disclosed in European Patent Publication EP-B-O-356425. The anchor rod, which is disclosed in this publication, is rotated about its longitudinal axis and is driven into a bore filled with components of a mortar mass. The insertable anchor rod destroys the packing in which the mortar mass components are contained. The rotatable anchor rod provides for more or less homogeneous intermixing of the components and comminution of the broken packing. The resulting load value of the attachment depends on the intermixing of the mortar mass components. To this end, in the past, a plurality of different designs of the anchor rod was proposed which should have insure an adequate intermixing of the mass components and comminution of the packing, without deactivating the mortar mass by overheating. The drawback of this technology consists in that the placing and handling of the mortar mass packing should be done with an utmost care, in particular with glass packing, to prevent the packing from being broken.

Also known are connection anchoring systems with which the mortar mass is preliminary mixed and is placed in a preliminary formed bore. Such connection anchoring systems which, e.g., are produced by the assignee of this application, are primarily used in brickwork, in particular, with the use of hollow bricks. Usually, a two-component mass is squeezed out of separate packings for the reactive components by a squeezing apparatus, is mixed in a mixing apparatus located in front of an outlet opening of the squeezing apparatus, and is injected in a bore which is preliminary formed in a brickwork. For better distribution of the preliminary mixed mortar mass and to prevent the mortar mass from penetrating into a hollow of a brick in which the bore is formed, the receiving bore is provided primarily with a sleeve having rupture points. To insure a complete filling of a receiving bore provided with a sleeve, the mortar mass should be injected toward the bore mouth from the base of the bore in accordance with a predetermined process. Then, the anchor rod is inserted into the bore filled with the mortar mass. After hardening of the mortar mass, the anchor rod, which is primarily formed as a thread anchor rod, becomes fixed in the bore. The load values, which are achieved in brickwork with the known attachment technology, depend primarily on the strength of the brick. During the attachment in a hollow material, e.g., in concrete, the achievable attachment values depend, in addition to adequate intermixing of the reactive components of the mortar mass, also on the position of the bore filled with a mortar mass. The filling of the bore with mortar mass components, which are stored in separate glass or plastic packings and are mixable only in the bore, can be relatively easily controlled. The viscosity of the mortar mass components is relatively low. This results in that upon being released from their packings, the mortar mass components flow, under their gravity forces, toward the back of a substantially more or less vertically extending bore. When the bore extend horizontally or is inclined upwards, or during an overhead mounting, the low viscosity presents substantial difficulties because the mortar mass flows out of the bore.

The mortar masses, which are mixed immediately before being injected into a receiving bore, have a high viscosity. Therefore, they are suitable for filling horizontal or upwardly inclined bores, as well as for the overhead mounting. However, a high viscosity can present a drawback for filling the bore. If the preliminary mixed mortar mass is not injected from the back of the bore to the bore mouth, it may happen that the bore would not be adequately filled with the mortar mass. In particular, in the region of the back of the bore, the anchoring region of the anchor rod can be inadequately embedded in the mortar mass, which negatively affects the achievable load values.

Accordingly, an object of the present invention is to provide an anchor rod to be received in a bore filled with a mortar mass which would insure an adequate filling of the back of the bore with the mortar mass having high viscosity.

Another object of the present invention is to provide an anchor rod which would insure as complete as possible embedding of the anchoring region in the mortar mass.

A further object of the present invention is to provide an anchor rod which can be used with a mortar mass the reactive components of which are mixed immediately before injection outside of a receiving bore.

A still further object of the present invention is to provide an anchor rod with which the danger of deactivation of the mortar mass, which fills the bore, as a result of overheating, is prevented.

SUMMARY OF THE INVENTION

These and other objects of the present invention, which will become apparent hereinafter, are achieved by providing an anchor rod to be received in a bore filled with a mortar mass and including a connection region and an anchoring region having a plurality of axially arranged one after another, conical enlargements a diameter of which increases in a setting direction. The conical enlargements are provided with circumferential sections radially spaced from a longitudinal axis of the anchor rod by a greatest distance, having a radius smaller by from about 0.1 mm to about 1.5 mm then a half of a nominal diameter of the anchoring region receiving bore, and extending, respectively, in a circumferential direction over an angle of up to 300°, preferably, over an angle from about 10° to about 90°.

The geometry of the anchoring region of the anchor rod according to the present invention insures that during the drive-in of the anchor rod, the mortar mass is displaced in a direction toward the back of the bore and is compressed. Only when the mortar mass reaches the bottom of the bore, can an adequately greater counterpressure be generated and which displaces the mortar mass radially so that it overlaps the circumferential sections of the conical enlargements, which are spaced from the longitudinal axis of the anchor rod by a greatest distance, and backwards. In this way, the preliminary mixed mortar mass, which does not completely fills the receiving bore, can be distributed over the entire depth of the receiving bore and, in particular, reach the back of the receiving bore. The excess amount of the mortar mass can be expelled through the bore mouth. Thereby, it is insured that the anchor rod is embedded in the mortar mass along the entire length of the anchoring region. The dimensions of the anchoring region of the anchor rod are so selected that an adequately large cross-section remains between the conical enlargements and the wall of the receiving bore that insures insertion of the anchor rod and prevents filtering out of ingredients containing in the mortar mass.

It is advantageous when one or several conical enlargements are provided on a circumferential section, which is radially spaced from the longitudinal axis of the anchor rod by a greatest distance, with recesses, preferably, in a form of knurling. Thereby, the cross-section, which remains between the bore wall and the conical enlargements, can be reduced in accordance with the flowability of the mortar mass, without causing sedimentation of the mortar mass or excessive increase of forces necessary for the insertion of the anchor rod in a receiving bore filled with a preliminary mixed mortar mass.

For the initial compaction of the motar mass, it is preferable when the recesses on the circumferential sections of two, axially following each other, conical enlargements are circumferentially offset relative to each other. In this way, additionally, a favorable condition for better intermixing of the mortar mass is created, which further contributes to the hardening reaction.

According to one preferred embodiment of the present invention, the conical enlargements are provided with flattening, preferably, extending parallel to each other. The flattenings are so arranged that a circumferential section which is radially spaced from the longitudinal axis of the anchor rod by a greatest distance and have a flattening, is spaced from the longitudinal axis at the flattening by a minimal radial distance which amounts to from 30% to 90% of a radial distance of a non-flattened circumferential section from the longitudinal axis. The selected geometry of the anchoring region of the anchor rod according to the present invention insures a desired initial displacement of the mortar mass filling the receiving bore toward the back of the bore upon driving of the anchor rod into the bore. Then, the mortar mass can flow backwards, without causing sedimentation or resistance which would have required the use of an excessive force for driving the anchor rod in. The formation of flattenings on the conical enlargement is technically simple and can be done in a cost-effective manner.

Advantageously, the flattenings of axially arranged one behind the other, conical enlargements are offset relative to each other in a circumferential direction by an angle from about 45° to about 180° C. With such displacement of the flattenings relative to each other, upon driving of an anchor rod in a receiving core, turbulent streams are generated in the mortar mass which favorably improves intermixing of the reactive components of the mortar mass.

In accordance with the present invention, the conical enlargements are adjoined, starting from a free front end of the anchoring region, by opposed conical regions the diameter of which diminishing in a setting direction. This favorably influences the displacement of the mortar mass toward the recesses or flattenings. Thereby, the resistance against the displacement of the anchor rod into a filled with a motor mass bore remains relatively small.

According to another preferred embodiment of the present invention, the axially following each other conical enlargements are offset relative to each other in a radial direction and with respect to the longitudinal axis of the anchor rod. The offset of the conical enlargements can be considered as an alternative to the formation of one-side flattenings and have the same effect with regard to the distribution of the mortar mass over the entire depth of the bore.

A particular good ratio of the distribution of the mortar mass to the resistance to the insertion of the anchor rod into a filled with a mortar mass bore is achieved when the radial offset with respect to the longitudinal axis amounts to from about 0.5 mm to about 2.5 mm.

When the radially offset, following one another, conical enlargements have an offset in a circumferential direction that amounts to from about 45° to about 180°, turbulence is generated inside the mortar mass which is displaced along the anchoring region backwards. This further favorable influences intermixing of the reactive components of the mortar mass.

It is advantageous when the anchoring region has an outer surface to which a mortar mass does not adhere. Preferably, to this end, the anchoring region is provided with a sheathing or a coating to which the mortar mass does not adhere. Thereby, the anchor rod, upon application of a load thereto, can be displaced with a fissure being formed in the bore. Thereby, the hardened mortar mass can be pressed against the bore wall, so that a form-locking connection is formed between the bore wall and the shell formed of the mortar mass. This secondary expansion defines a fissure-handling capability of an anchor rod, and the anchor rod can be inserted in an area of concrete subject to tensile stresses.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

DESCRIPTION OF THE DRAWINGS

FIG. 1 shows an axial view of a first embodiment of an anchor rod according to the present invention;

FIG. 2 shows an axial view of a second embodiment of an anchor rod according to the present invention; and FIG. 3 shows an axial view of a third embodiment of an anchor rod according to the present invention.

DETAILED DESCRIPTION OF THE PREFERRED EMBODIMENTS

An anchor rod according to the present invention, which is shown in FIG. 1, is generally designated with a reference numeral 1. The anchor rod 1 includes a connection region 2 which is adjoined, in a setting direction, by an anchoring region 3. In the use position, the anchoring region 3 is located in a receiving bore which is filled with a mortar mass. The anchoring region 3 has several, e.g., four conical enlargements 4 arranged axially one after another. The conical enlargement 4 are widened in the setting direction up to a circumferential section 5 which is spaced from a longitudinal axis A of the anchor rod 1 by a greatest distance. The radius r of the circumferential section 5 is smaller by from about 0.1 mm to about 1.5 mm than a half of the nominal diameter of the bore in which the anchor rod 1 is received.

In the region of the circumferential section 5, the conical enlargements 4 are provided with recesses 7 which, as shown in the drawing, can be formed, e.g., by longitudinal knurling. Instead of the longitudinal knurling, the recesses 7 can be formed by rough toothing and the like. As a result of the formation of the recesses 7, the circumferential section 5, which is radially spaced from the longitudinal axis A of the anchor rod 1 by a greatest distance, is segmented. The circumferentially extending circumferential sections 5 of a conical enlargement 4 extend over an angle which amounts maximum to 300°. Preferably, all of the strung one after another circumferential sections 5 of a single cone-like enlargement 4 extend in a circumferential direction, over an angular region from about 10° to about 90°.

Starting from a free front end of the anchoring region 3, the conical enlargements 4 are adjoined by respective opposed cones 6 the diameter of which diminishes in the setting direction. The opposed cones 6 adjoin, respectively, the circumferential sections 5 which, as it has already been discussed above, are radially spaced from the longitudinal axis A of the anchor rod by the largest distance.

An anchor rod according to the present invention, which is shown in FIG. 2, is generally designated with a reference numeral 21. The basic design of the anchoring region 23 of the anchor rod 21 is similar to the design of the anchoring region 3 of the anchor rod 1 shown in FIG. 1. Corresponding elements of the anchor rod 21 are designated with the same reference numerals as respective elements of the anchor rod 1 but increased by 20. The main difference between the anchor rod 1, shown in FIG. 1, and the anchor rod 21, shown in FIG. 2, consists in that the conical enlargements 24 are provided with one-side flattenings 27. The flattenings 27 extend in the axial direction, preferably, parallel to the longitudinal axis A of the anchor rod 21. The arrangement of the flattenings 27 is so selected that a circumferential section 25, which is radially spaced from the axis A of the anchor rod 21 by a greatest distance, is spaced at a respective flattening 27 by a minimal distance s which amounts from 30% to to 90% of the radial distance r of the non-flattened circumferential section 25 from the longitudinal axis A. The flattening 27 of the conical enlargements 24, which follow one another in the axial direction, are circumferentially offset relative to each other. In the embodiment of the anchor rod shown in FIG. 2, this circumferential offset amounts to about 180°. However, the conical enlargements 24 can have a different circumferential offset of the flattenings 27 which can amount from about 45° to about 180°. Starting from the free end of the anchoring region 23 of the anchor rod 21, the coneical enlargements 24 are again associated with respective opposed cones 26 the diameter of which diminishes in the setting direction. The opposed cones 26 adjoin, respectively, the circumferential section 25 which are radially spaced from the longitudinal axis A of the anchor rod 21 by a largest distance.

A further embodiment of an anchor rod according to the present invention is shown in FIG. 3. The anchor rod shown in FIG. 3 is generally designated with a reference numeral 31. The connection region of the anchor rod 31 is designated with a reference numeral 32, and its anchoring region is designated with a reference numeral 33. A plurality of conical enlargement 34 is provided in the anchoring region 33. The conical enlargement 34 are radially offset relative to each other with respect to the longitudinal axis A of the anchor rod 31. The radial offset d relative to the longitudinal axis A amounts from about 0.5 mm to about 2.5 mm. The radially offset conical enlargement 34 are also offset relative to each other in a circumferential direction. Preferably, the circumferential offset of axially arranged one after another, conical enlargements 34 amounts from about 45° to about 180°. In the embodiment of the anchor rod shown in FIG. 3, the circumferential offset of the enlargements 34 amounts to about 180°. The enlargements 34, which are radially and circumfernetially offset relative to each other, are separated from each other by substantially cylindrical stub sections 38. The stub sections 38 adjoin, respectively, circumferential sections 35 which are radially spaced from the axis A of the anchor rod 31 by a largest distance. The cylindrical stub sections 38 can likewise be radially offset relative to each other and with respect to the longitudinal axis A of the anchor rod 31. As shown in FIG. 3, the cylindrical surface of a cylindrical stub section 38 can be radially spaced, e.g., from the longitudinal axis A by the same radial distance as an immediately adjoining the stub section enlargement 34. A circumferential surface 35 of the frontmost conical enlargement 34 can be adjoined, as shown, by an opposed cone 36.

In order for the anchor rods 1, 21, 31 to manifest a secondary expansion action in case of formation of a crevice in the receiving bore, the anchor rod 1, 21, 31 have, in their respective anchoring regions 3, 23, and 33 an outer surface to which a mortar mass does not adhere. Preferably, to this end, the anchoring region 3, 23, 33 have a non-adhering coating or are provided with a sheating.

Though the present invention has been shown and described with reference to a preferred embodiment, such is merely illustrative of the present invention and is not to be construed as to be limited to the disclosed embodiment and/or details thereof, and the present invention includes all modifications, variations and/or alternate embodiments within the spirit and scope of the present invention as defined by the appended claims.

What is claimed is:

1. An anchor rod to be received in a bore filled with mortar mass, comprising a connection region (22), and an anchoring region (23) having a free end and a plurality of axially arranged one after another, conical enlargements (24) a diameter of which increases in a direction toward the free end, wherein the conical enlargements are provided with circumferential sections (25) radially spaced from a longitudinal axis of the anchor rod (21) by a greatest distance, having a radius (r) smaller by from about 0.1 mm to about 1.5 mm than a half of a nominal diameter of the anchoring region receiving bore, and extending, respectively, in a circumferential direction over an angle of up to 300°, wherein the conical enlargements (24) are provided with flattenings (27), and wherein a circumferential section (25), which is radially spaced from the longitudinal axis (A) of the anchor rod (21) by a greatest distance and has a flattening (27), is spaced from the longitudinal axis (A) at the flattening (27) by a minimal radial distance (s) which amounts to from 30% to 90% of the radial distance (r) of a non-flattened circumferential section (25) from the longitudinal axis (A).

2. An anchor rod according to claim 1, wherein the flattenings (27) extend parallel to each other.

3. An anchor rod according to claim 1, wherein the flattenings (27), which are provided on the arranged one after another conical enlargements (24), are offset relative to each other in the circumferential direction.

4. An anchor rod according to claim 3, wherein the flattenings (27) are offset relative to each other in the circumferential direction by an angle from about 45° to about 180°.

* * * * *